United States Patent
Goldberg

(10) Patent No.: US 7,092,993 B2
(45) Date of Patent: Aug. 15, 2006

(54) METHOD AND SYSTEM FOR CUSTOMIZING E-MAIL TRANSMISSIONS BASED ON CONTENT DETECTION

(76) Inventor: Bernel Goldberg, 13413 NE. 27th St., Bellevue, WA (US) 98005

( * ) Notice: Subject to any disclaimer, the term of this patent is extended or adjusted under 35 U.S.C. 154(b) by 715 days.

(21) Appl. No.: 10/062,739

(22) Filed: Feb. 3, 2002

(65) Prior Publication Data

US 2002/0178228 A1 Nov. 28, 2002

Related U.S. Application Data

(63) Continuation-in-part of application No. 09/811,497, filed on Mar. 20, 2001.

(51) Int. Cl.
*G06F 15/16* (2006.01)
(52) U.S. Cl. .................. 709/206; 379/93.01; 370/465; 715/513; 706/10
(58) Field of Classification Search ................ 709/206, 709/207, 246, 230; 715/513; 706/10
See application file for complete search history.

(56) References Cited

U.S. PATENT DOCUMENTS

| | | | | |
|---|---|---|---|---|
| 5,634,005 | A * | 5/1997 | Matsuo ........................ 709/206 |
| 6,073,133 | A * | 6/2000 | Chrabaszcz ................... 707/10 |
| 6,092,101 | A * | 7/2000 | Birrell et al. ................ 709/206 |
| 6,453,338 | B1 * | 9/2002 | Shiono ........................ 709/206 |
| 6,460,074 | B1 * | 10/2002 | Fishkin ....................... 709/206 |
| 6,499,021 | B1 * | 12/2002 | Abu-Hakima ................. 706/10 |
| 6,732,149 | B1 * | 5/2004 | Kephart ....................... 709/206 |
| 6,775,689 | B1 * | 8/2004 | Raghunandan ............... 709/206 |
| 6,779,178 | B1 * | 8/2004 | Lloyd et al. ................. 717/174 |
| 2002/0049793 | A1 * | 4/2002 | Okumura et al. ............ 707/526 |
| 2002/0069223 | A1 * | 6/2002 | Goodisman et al. ......... 707/513 |
| 2002/0107924 | A1 * | 8/2002 | Walsh ......................... 709/206 |
| 2002/0169840 | A1 * | 11/2002 | Sheldon et al. ............. 709/206 |
| 2004/0073634 | A1 * | 4/2004 | Haghpassand .............. 709/220 |

* cited by examiner

*Primary Examiner*—Thong Vu
*Assistant Examiner*—Hai V. Nguyen
(74) *Attorney, Agent, or Firm*—Mitch Harris, Atty at Law, LLC; Andrew M. Harris

(57) ABSTRACT

A method and system for customizing e-mail transmissions based on content detection determines when an e-mail user likely intends to customize an e-mail message and prompts the user to customize the e-mail message if they have not done so. A parser parses the e-mail message (including the subject line) for clues that indicate that the sender likely intends to customize the message in a particular manner, then the e-mail program prompts the user to perform the customization. The prompt may be generated in response to the e-mail program detecting that customization settings have not been entered or may be generated unconditionally upon detecting a clue. The parser may also decompose sentences to provide matching of common phrases or meanings with phrases or meanings that indicate that the sender likely intends to perform a particular customization. The e-mail program may further "jump" to the appropriate input area for the customization in response to detecting an associated clue or the e-mail program may skip on or both of jumping and prompting in certain cases.

32 Claims, 3 Drawing Sheets

METHOD AND SYSTEM FOR CUSTOMIZING E-MAIL TRANSMISSIONS BASED ON CONTENT DETECTION

RELATED APPLICATIONS

The present application is a continuation-in-part of U.S. Patent Application entitled "METHOD AND SYSTEM FOR COMPLETING E-MAIL TRANSMISSIONS" Ser. No. 09/811,497 filed on Mar. 20, 2001, from which it claims priority, and is further related to U.S. Patent Application entitled "METHOD AND SYSTEM FOR COMPLETING E-MAIL TRANSMISSIONS BASED ON CONTENT DETECTION" Ser. No. 10/038,261 filed on Jan. 7, 2002, which is a continuation in part of application Ser. No. 09/811,497 referenced above. This application is also related to U.S. Patent Application entitled "METHOD AND SYSTEM FOR MODIFYING THE_CONTENT OF E-MAIL TRANSMISSIONS BASED ON CUSTOMIZATION SETTINGS" Ser. No. 10/066,243 filed concurrently herewith. All of the above applications are herein incorporated by reference.

BACKGROUND OF THE INVENTION

1. Field of the Invention

The present invention relates generally to electronic mail systems, and more specifically, to a method and system for customizing e-mail transmissions by prompting a user based on content of an electronic message.

2. Background of the Invention

Present-day network systems communicate through a variety of channels in order to interconnect computers. Electronic mail is in widespread use as a mechanism for communicating messages and for transferring documents, images and other media such as sound files.

E-mail programs and other programs such as Internet browsers having e-mail capability permit a computer user to create a message that is sent to an e-mail server for the recipient of the message. Typical e-mail programs provide a variety of features for customizing an e-mail message. For example, attachment lists permit the computer user to attach documents such as word-processor output files, encoded images such as scanned photographs that are rendered in a data storage format such as the joint photography and electronics group (JPEG) format and other media such as sound files. E-mail programs also permit the setting of priority level so that a recipient may be notified of the urgency of a message without reading the content and/or flagging an e-mail message as personal, private or confidential. Further, the above-described e-mail programs permit copying (cc:) and blind-copying (bcc:) additional intended recipients of an e-mail message, adding an electronic signature, and/or encrypting e-mail content for security.

Often, a computer user generating an electronic mail message will intend to customize an e-mail message, but forget some or all of their intended customizations.

Therefore, it would be desirable to provide a method and system for customizing an e-mail transmission by using information contained within the e-mail message to prompt the user to customize the message.

SUMMARY OF THE INVENTION

The above objective of customizing e-mail messages is achieved in a method and system that receive a user input indicating that an e-mail message has been completed, parse the e-mail message for clues indicating that a customization is likely intended, and in response to the parser detecting clues, generating a user prompt to indicate to a user that a customization of the e-mail message is likely intended. The method may be embodied in a computer program product for performing the method within a general purpose computer including personal digital assistants (PDAs), cell phones with e-mail capability and the like.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

Figure 1:
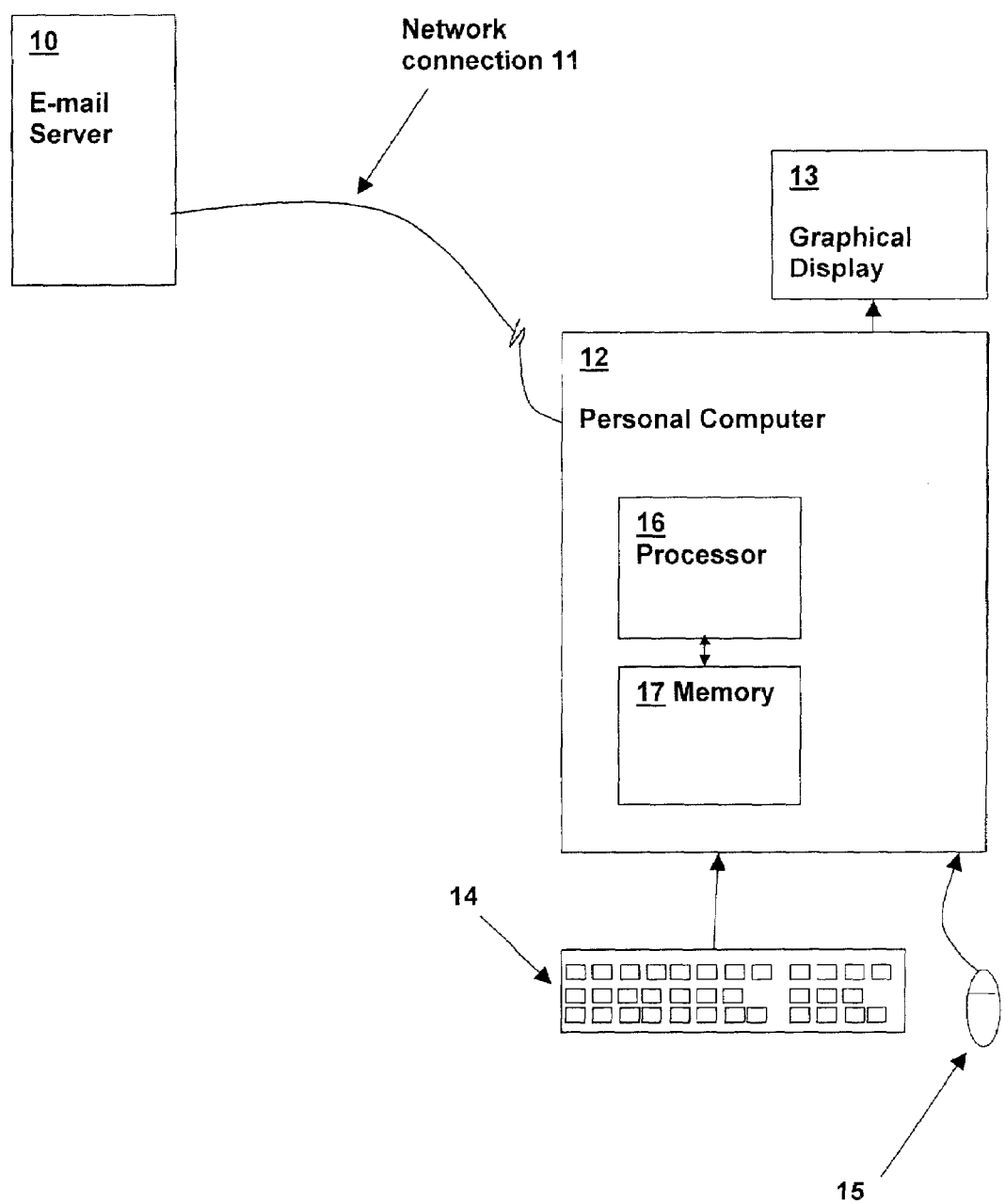
FIG. 1 is a block diagram depicting a networked computer system in which a preferred embodiment of the invention may be practiced.

Referring now to the figures and in particular to FIG. 1, a networked computer system within which a preferred embodiment of the present invention may be practiced is depicted in a block diagram. To support e-mail functions, an e-mail server 10 is coupled to the network via a network connection 11. Also coupled to the network is a personal computer 12 having a processor 16 coupled to a memory 17 for executing program instructions from memory 17. Personal computer 12 is coupled to a graphical display 13 for displaying program output and input devices such as a mouse 15 and a keyboard 14 for receiving user input. The networked computer system may be coupled to a public network such as the Internet, or may be a private network such as the various "intra-nets" that are implemented within corporate offices and other installations requiring secure data communications.

Within memory 17, an e-mail program embodying a method in accordance with a preferred embodiment of the present invention is executed by processor 16. Personal computer 12 is included to provide a demonstrative example of a general purpose computer, and it will be understood by those skilled in the art that the techniques of the present invention apply to a variety of other e-mail applications such as dedicated Internet appliances and large mainframe computers having user terminals. The present invention also applies to personal e-mail appliances such as personal digital assistants (PDAs) and e-mail enabled pagers and cellular telephones.

Figure 2:
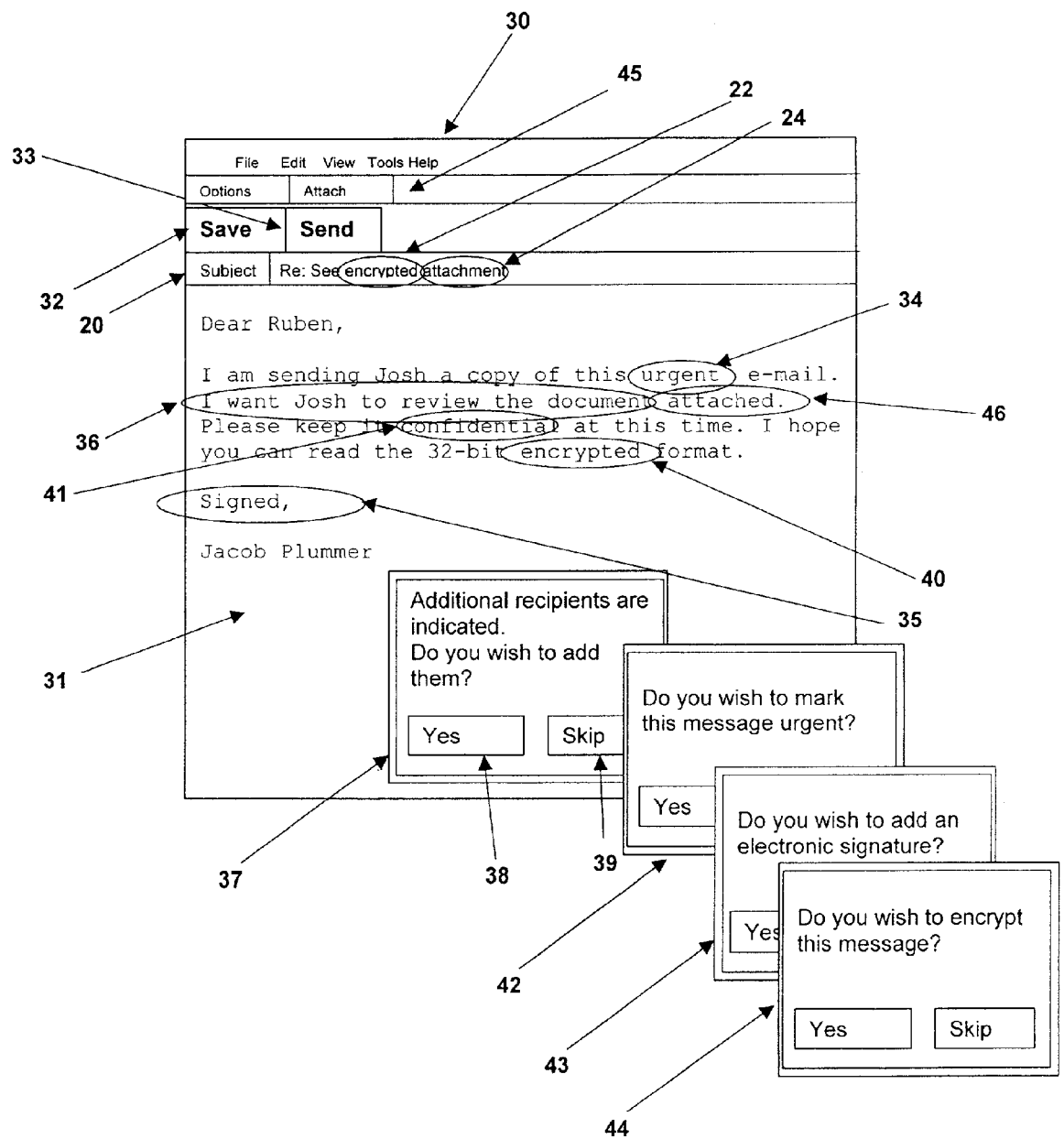
FIG. 2 is a pictorial diagram depicting output of an e-mail program displayed on the graphic display of FIG. 1, having a user prompt in accordance with a preferred embodiment of the invention.

Referring now to FIG. 2, an output of an e-mail program in accordance with a preferred embodiment of the invention is depicted. While the invention is depicted with screens in American English language, the invention may be adapted to other languages and use clues that are localized to e-mail use in other languages and other countries. E-mail program output 30 forms a user output on graphical display 13 to permit a computer user to interact with the e-mail program executing within personal computer 12. E-mail program output 30 has a frame with menu options, a message area 31 for entering the text of e-mail messages via keyboard 14, and a subject area 20 for entering a subject heading for the e-mail message.

Within the exemplary e-mail message shown in message area 31, there are a variety of clues 34, 35, 36, 40, 41 and 46 that the sender of the e-mail message intends to customize the e-mail. Further, subject area 20 contains further clues 22 and 24 that the e-mail sender intends to customize the e-mail message. A toolbar 45 includes buttons for setting message options or initiating an options menu and an attach button for providing attachments to add attachments to the e-mail, but at times an e-mail sender will forget to customize the e-mail message before sending the e-mail or saving the email for later sending. The e-mail message is sent by pressing a send button 33 in response to which the e-mail message and any attachments are sent to recipient's e-mail server 10, with the characteristics in accordance with the customization options that are set. Or, the e-mail message may be saved along with the customized characteristics for later transmission by pressing a save button 32.

By parsing the e-mail message prior to sending or upon saving an e-mail message, the e-mail program can remind the sender to customize the e-mail message in response to detecting clues such as 22, 24, 34, 35, 36, 40, 41 and 46, indicating that a customization is likely intended and the e-mail program does not find that the customization has been performed or is inconsistent with customization settings. Alternatively, the e-mail program may skip the evaluation of customization settings altogether and prompt the user to provide customization in response to detected clues. Also, the e-mail program may provide a prompt path that "jumps" the user to the appropriate input area for the customization setting expected in light of the detected clue.

The above-described clue parsing may also be performed in response to the user clicking an icon, entering a menu option or taking another action to trigger parsing for clues and generating prompts in response to finding customization clues.

There are a variety of clues that may indicate a sender intends to customize the message. The above-incorporated patent application describes determining a user's intent to provide an attachment based on a keyword clue, phrase clue or sentence clue embedded in an e-mail message. Further clues are described herein to determine other intended customizations, and the use of keyword clues, phrase clues and sentence clues are equally applicable to the various types of customizations to which the present invention applies. Clue 34 ("urgent") is an example of a keyword clue indicating that customization of an urgent level of priority may be intended for the message. Other likely keywords in this category are "ASAP", "immediately", "critical" etc. A parser sub-program or plug-in within the e-mail program may look for a standard list of keywords, or a separate user interface may allow the e-mail user to customize the e-mail program or plug-in to search for a user-entered list of keywords. Once the e-mail user has customized the list of keywords, messages may be scanned for those keywords without prompting the user for keyword entry.

In addition to priority customization, other examples of customization that may be inferred as intended by a user are: encrypting a message, copying the message to other recipients, adding an electronic signature, adding an indication of the content type to the e-mail message and as described in the above-incorporated patent application, adding attachments to a message. Table 1 shows exemplary keywords and actions for customization prompts for various customization features of the e-mail program.

TABLE 1

| Customization Feature | Exemplary Keywords | Action |
| --- | --- | --- |
| Message Priority | Urgent, ASAP, immediately, quick, critical | Prompt with priority setting dialog |
| Encryption | encrypt, encode | Prompt with option to set encryption |
| cc: and bcc: | copied, copy, distribution | Prompt with option to add recipients |
| Electronic Signature | sign, signed | Prompt with option to add signature |
| Attachment, "N attachments" | attach, attached, enclosed | Prompt with option to add attachment |
| Message type | private, confidential, privileged, secret, personal | Prompt with option to set message type |

Another type of clue is the phrase clue 36. Phrase clues as in present exemplary clue 36 provide a syntactic clue that indicates that a customization is intended such as "I want Josh to review the document" indicating that a cc: or bcc: to Josh might be intended. Many other possible phrases may indicate a clue and a customization type. Again, phrase clues may be entered by the user to customize a list of phrases similarly to the above-described key word entry, or a standard list of key phrases may be provided. Advanced parser mechanisms may be implemented within the parser to decompose sentences to determine whether or not phrase clues are present.

When the e-mail program has determined that the sender of the e-mail intends to customize an e-mail message, the user may be queried by a prompt dialog 37. As described above, prompt dialog 37 may be generated in further response to the e-mail program determining that customization settings have not been entered, or may be generated independent of existing customization settings. Prompt dialog 37 notifies the user that an additional recipient was suggested by the message text (via clue 36) and no cc: or bcc: list has been entered in the e-mail program recipient entry area. The sender may then enter the recipient entry area by pressing yes button 38 via the e-mail program causing a jump to the appropriate input area (in this case the recipient list) or the e-mail program may directly access an address book to provide a recipient to be optionally incorporated by a prompt, or the user may elect to skip the recipient entry via skip button 39. Similarly, dialogs 42–44 demonstrate possible prompts based on other customization type indications detected via clues. For example, clue 34 which is a "priority" type clue triggers generation of priority dialog 42 which asks the user if they wish to mark the message in conformity with the clue (alternatively, the dialog could ask if the user wished to set the priority of the message). Clue 35 causes dialog 43 to be presented, prompting for addition of an electronic signature and either of clue 22 or clue 40 will cause dialog 44 to be presented, prompting for selection of encryption for the e-mail message. Clues 24 and 46 are an "attachment" clues, indicating that an e-mail attachment is likely intended as described in the above-incorporated patent application and can cause a dialog to be generated prompting the user to add an attachment or a "jump" to the attachment list entry area. A further prompt for attachments may be based on detecting a number of attachments specified, such as "4 attachments" or "Attachments (4)" or "attachments" which will permit prompting for additional attachments or removal of attachments if the number does not match.

Figure 3:
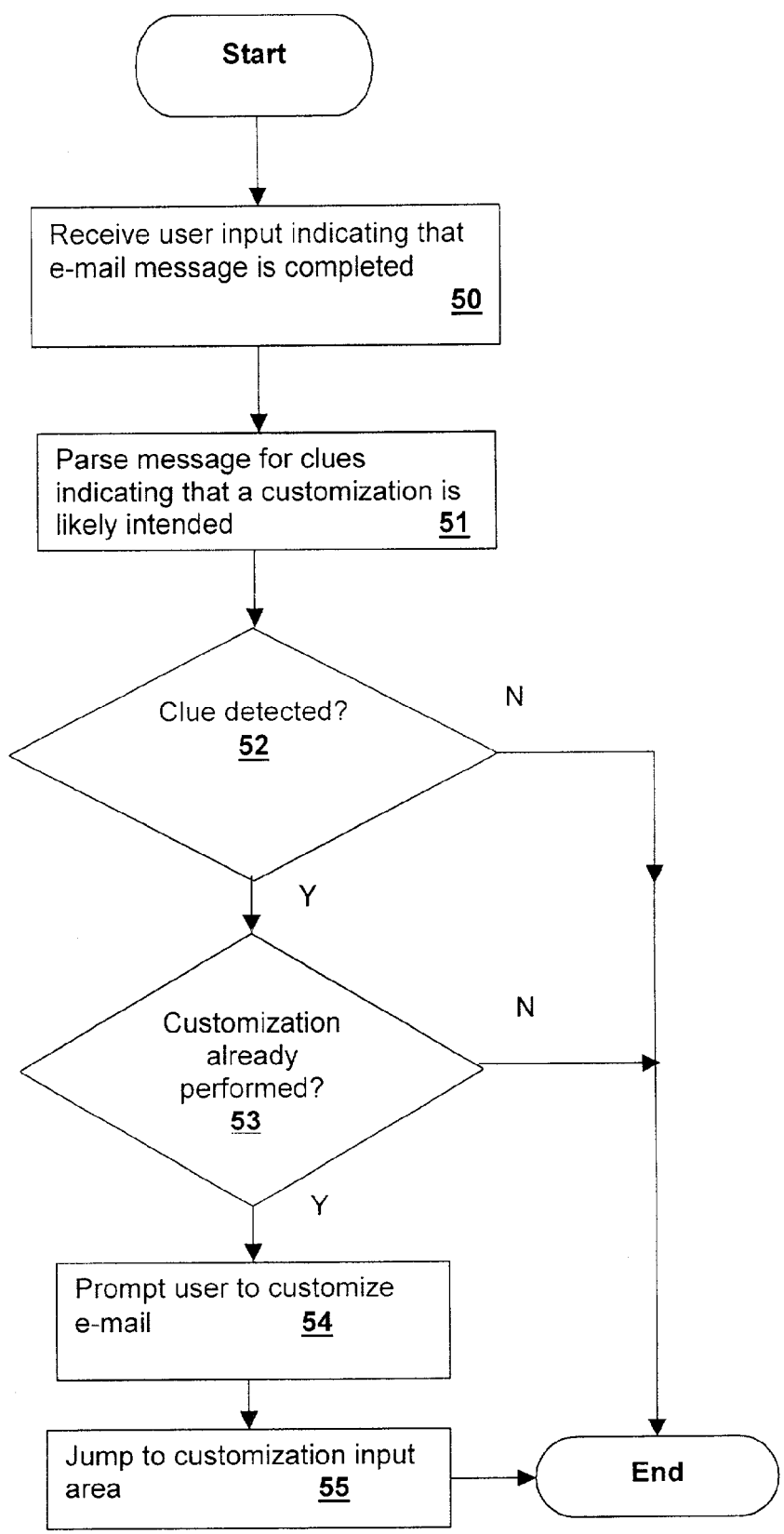
FIG. 3 is a flowchart depicting operation of an e-mail completion system in accordance with a preferred embodiment of the invention.

Referring now to FIG. 3, the e-mail customization system of the present invention is depicted in a flowchart. When the e-mail sender provides a user input indicating that an e-mail message is completed (step 50), the message text (including the subject line and any other text areas) is parsed for clues indicating that a customization is likely intended (step 51). If such a clue is found (decision 52) and the customization has not been performed (or is alternatively inconsistent with the clue) (step 53) the user is prompted to customize the message (step 54), otherwise the e-mail message is sent or saved in accordance with the user input in step 50. When the user is prompted to customize the message (step 54) and elects to do so, the program input may "jump" to the appropriate input area for the customization (step 55). Note that the exemplary system depicted in the flowchart of FIG. 3 may be implemented in a variety of fashions, such as skipping the customization detection (step 53) or skipping the prompting (step 54). For example, the parsing may be skipped for clues relating to a customization type if the particular customization is present, or the customization modules may interact with the parser to prompt the user only if clues indicating an inconsistent customization is found. Also, in certain cases such as setting priority the program may skip prompting and input area jumping (Steps 54 and 55).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A method for completing an e-mail transmission, comprising:
   collecting keywords from user input to create a set of keywords;
   receiving a user input indicating that an e-mail message is ready for parsing;
   parsing said e-mail message for clues comprising keywords indicating that a selectable state of a customization setting other than a state currently selected for sending said e-mail message is likely intended by matching members of said set of keywords with words within said e-mail message; and
   in response to said parsing detecting a clue, generating a user prompt to indicate to a user that said other state of said customization setting for said email message is likely intended.

2. The method of claim 1, wherein said parsing parses a message body of said e-mail message.

3. The method of claim 1, further comprising determining, in response to said parsing detecting a clue, whether or not said currently selected state matches a likely intended state and wherein said generating a user prompt is further performed in response to said determining having determined that said likely intended state does not match said currently selected state.

4. The method of claim 1, wherein said generating further comprises jumping to a selection area for selecting said selectable state.

5. The method of claim 1, wherein said user input indicating that said email message is ready for parsing is a user input instructing an e-mail program to send said e-mail message.

6. The method of claim 1, wherein said user input indicating that said e-mail message is ready for parsing is a user input instructing an e-mail program to save said e-mail message.

7. The method of claim 1, wherein said user input indicating that said e-mail message is ready for parsing is a user input instructing an e-mail program to parse said e-mail message.

8. The method of claim 1, wherein said clues indicate a level of urgency of said e-mail message and wherein said user prompt is generated to include a query asking said user if they wish to set an urgency level for said e-mail message.

9. The method of claim 1, wherein said clues indicate that the user likely intends to encrypt said e-mail message and wherein said user prompt is generated to include a query asking the user if they wish to encrypt said e-mail message.

10. The method of claim 1, wherein said clues indicate that the user likely intends to set a notification of a content type of said e-mail message, and wherein said user prompt is generated to include a query asking the user if they wish to set a notification of content type for said e-mail message.

11. A method for completing an e-mail transmission, comprising:
    receiving a user input indicating that an e-mail message is ready for parsing;
    parsing said e-mail message for clues comprising phrases indicating that a selectable state of a customization setting other than a state currently selected for sending said e-mail message is likely intended by decomposing sentences within said e-mail message to detect phrases indicating that said other state is likely intended; and
    in response to said parsing detecting a clue, generating a user prompt to indicate to a user that said other state of said customization setting for said e-mail message is likely intended.

12. The method of claim 11, wherein said method further comprises collecting key phrases from user input to create a set of key phrases, and wherein said parsing is performed by matching members of said set of key phrases with sentences within said e-mail message.

13. A system for completing an e-mail transmission, comprising:
    a memory for storing program instructions and data;
    a processor coupled to said memory for executing said program instructions; and
    a user input device coupled to said processor for receiving user input, wherein said program instructions include instructions for
    collecting keywords from user input to create a set of keywords,
    receiving a user input indicating that an e-mail message is ready for parsing,
    parsing said e-mail message for clues indicating that a particular selectable state of a customization setting for sending said e-mail message is likely intended by matching members of said set of key words with words within said e-mail message,
    determining whether or not said particular selectable state is currently selected, and
    in response to determining that said particular state is not currently selected, generating a user prompt to indicate to a user that a different state is likely intended.

14. The system of claim 13, wherein said program instructions for parsing parse a subject line of said e-mail message.

15. The system of claim 13, wherein said program instructions for parsing parse a message body of said e-mail message.

16. The system of claim 13, wherein said user input indicating that said e-mail message has been completed is a user input instructing an e-mail program to send said e-mail message.

17. The system of claim 13, wherein said user input indicating that said e-mail message has been completed is a user input instructing an e-mail program to save said e-mail message.

18. The system of claim 13, wherein said clues indicate a level of urgency of said e-mail message and wherein said program instructions for generating generate a query asking said user if they wish to set an urgency level for said e-mail message.

19. The system of claim 13, wherein said clues indicate that the user likely intends to encrypt said e-mail message and wherein said program instructions for generating generate a query asking the user if they wish to encrypt said e-mail message.

20. The system of claim 13, wherein said clues indicate that the user likely intends to set a notification of content type of said e-mail message, and wherein said program instructions for generating generate a query asking the user if they wish to set a notification of content type for said e-mail message.

21. A system for completing an e-mail transmission, comprising:
a memory for storing program instructions and data;
a processor coupled to said memory for executing said program instructions; and
a user input device coupled to said processor for receiving user input, wherein said program instructions include instructions for
receiving a user input indicating that an e-mail message is ready for parsing,
parsing said e-mail message for clues comprising phrases indicating that a particular selectable state of a customization setting for sending said e-mail message is likely intended by decomposing sentences within said e-mail message to detect phrases indicating that said different state is likely intended,
determining whether or not said particular selectable state is currently selected, and
in response to determining that said particular state is not currently selected, generating a user prompt to indicate to a user that a different state is likely intended.

22. The system of claim 21, and wherein said program instructions further comprise program instructions for collecting key phrases from user input to generate a set of key phrases and wherein said program instructions for parsing match members of said set of key phrases with sentences within said e-mail message.

23. A computer program product comprising signal-bearing media encoding program instructions for execution within a general purpose computer, wherein said program instructions comprise program instructions for:
collecting keywords from user input to create a set of keywords;
receiving a user input indicating that an e-mail message is ready for parsing,
parsing said e-mail message for clues comprising keywords indicating that a particular selectable state of a customization setting for sending said e-mail message is likely intended by matching members of said set of keywords with words within said e-mail message,
determining whether or not said particular selectable state is currently selected, and
in response to determining that said particular state is not currently selected, generating a user prompt to indicate to a user that a different state is likely intended.

24. The computer program product of claim 23, wherein said parsing parses a subject line of said e-mail message.

25. The computer program product of claim 23, wherein said parsing parses a message body of said e-mail message.

26. The computer program product of claim 23, wherein said user input indicating that said e-mail message has been completed is a user input instructing an e-mail program to send said e-mail message.

27. The computer program product of claim 23, wherein said user input indicating that said e-mail message has been completed is a user input instructing an e-mail program to save said e-mail message.

28. The computer program product of claim 23, wherein said clues indicate a level of urgency of said e-mail message and wherein said program instructions for generating generate a query asking said user if they wish to set an urgency level for said e-mail message.

29. The computer program product of claim 23, wherein said clues indicate that the user likely intends to encrypt said e-mail message and wherein said program instructions for generating generate a query asking the user if they wish to encrypt said e-mail message.

30. The computer program product of claim 23, wherein said clues indicate that the user likely intends to set a notification of content type of said e-mail message, and wherein said program instructions for generating generate a query asking the user if they wish to set a notification of content type for said e-mail message.

31. A computer program product comprising signal-bearing media encoding program instructions for execution within a general purpose computer, wherein said program instructions comprise program instructions for:
receiving a user input indicating that an e-mail message is ready for parsing,
parsing said e-mail message for clues comprising keywords indicating that a particular selectable state of a customization setting for sending said e-mail message is likely intended by matching members of said set of keywords with words within said e-mail message,
determining whether or not said particular selectable state is currently selected, and
in response to determining that said particular state is not currently selected, generating a user prompt to indicate to a user that a different state is likely intended.

32. The computer program product of claim 31, wherein said clues comprise phrases, and further comprising program instructions for collecting key phrases from user input to generate a set of key phrases and wherein said program instructions for parsing match members of said set of key phrases with sentences within said e-mail message.

* * * * *